United States Patent [19]
Hidaka

[11] Patent Number: 5,912,511
[45] Date of Patent: Jun. 15, 1999

[54] WIRE HARNESS FOR VEHICLES

[75] Inventor: Mitsuru Hidaka, Yokkaichi, Japan

[73] Assignee: Sumitomo Wiring Systems, Ltd., Japan

[21] Appl. No.: 08/820,524

[22] Filed: Mar. 19, 1997

[30] Foreign Application Priority Data

Mar. 19, 1996 [JP] Japan .................................. 8-063145

[51] Int. Cl.⁶ .................................................. B60L 1/00
[52] U.S. Cl. ...................... 307/10.1; 174/72 A; 307/147; 361/826
[58] Field of Search .................. 174/72 A, 72 R, 174/71 R; 307/9.1, 10.1, 10.6, 10.7, 10.8, 147, 148; 180/322–323; 361/826, 827, 828

[56] References Cited

U.S. PATENT DOCUMENTS

| 3,952,209 | 4/1976 | Shaklee et al. | 307/9 |
| 4,122,357 | 10/1978 | Sumida | 307/10.1 |
| 4,578,591 | 3/1986 | Floyd et al. | 307/38 |
| 4,887,263 | 12/1989 | Steely | 307/10.1 |
| 4,942,571 | 7/1990 | Moller et al. | 307/10.1 |
| 5,194,756 | 3/1993 | Darbesio | 307/10.1 |
| 5,465,010 | 11/1995 | Rimmer | 307/9.1 |
| 5,508,689 | 4/1996 | Rado et al. | 307/10.6 |
| 5,610,447 | 3/1997 | Nishikawa et al. | 307/38 |
| 5,610,454 | 3/1997 | Nishikawa et al. | 307/147 |
| 5,623,169 | 4/1997 | Sugimoto et al. | 307/10.1 |
| 5,703,411 | 12/1997 | Bella et al. | 307/10.1 |
| 5,760,490 | 6/1998 | Yanase | 307/10.8 |

FOREIGN PATENT DOCUMENTS

| 361141 | 3/1991 | Japan . |
| 8216805 | 8/1996 | Japan . |

*Primary Examiner*—Richard T. Elms
*Attorney, Agent, or Firm*—Jordan B. Bierman; Bierman, Muserlian and Lucas

[57] ABSTRACT

The harness system adapts to a first type of vehicle having a tail ledge with right- or left-had drive and a second type of vehicle having no tail ledge with right- or left-hand drive. The harness wiring is so arranged that a front harness and a combined harness integrating floor harness and rear harness can be commonly used for these four types of vehicles. Only a combined harness integrating cowl harness and instrument harness is differently wired for the right- or left-hand drive vehicle. The front harness and the two sets of combined harnesses are connected to one another through a connecting means located on the same side, either on the right or left side of the vehicle.

9 Claims, 3 Drawing Sheets

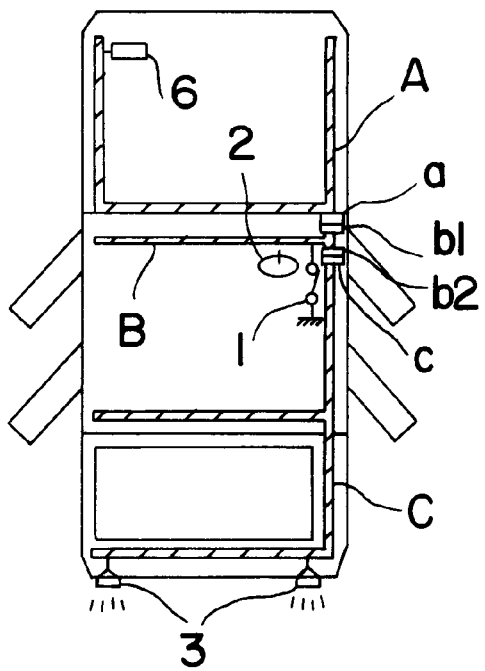
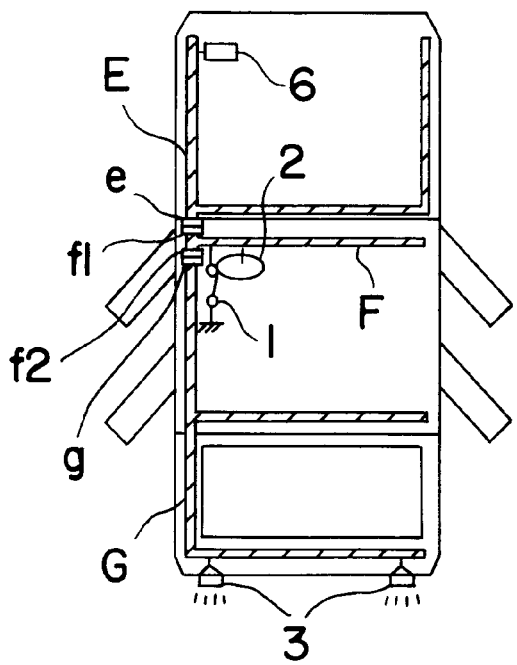
FIG. 1(A)  FIG. 1(B)
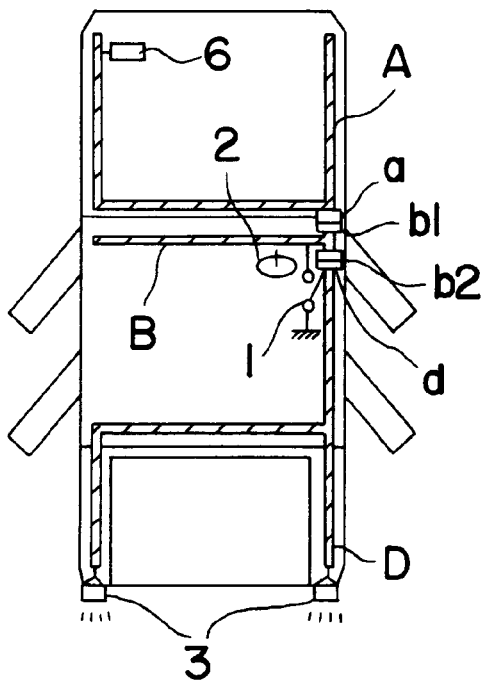
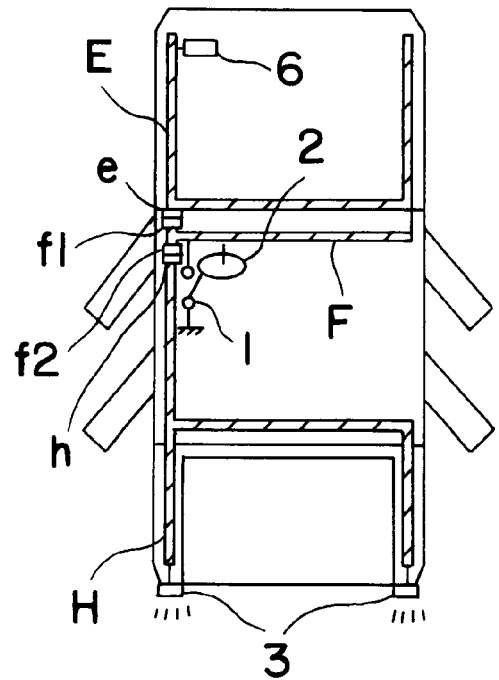
FIG. 1(C)  FIG. 1(D)

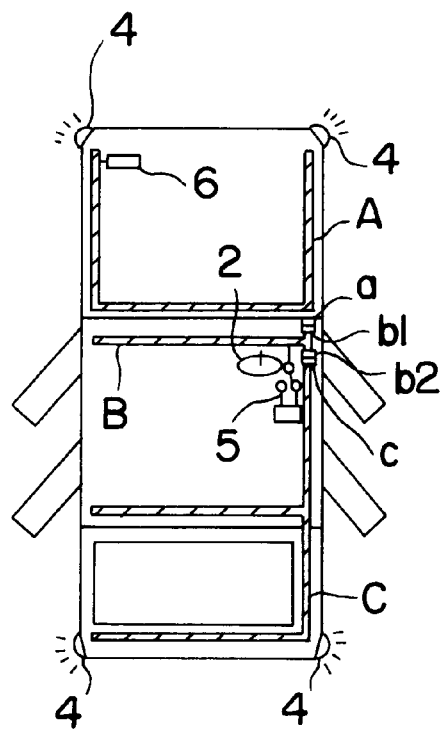
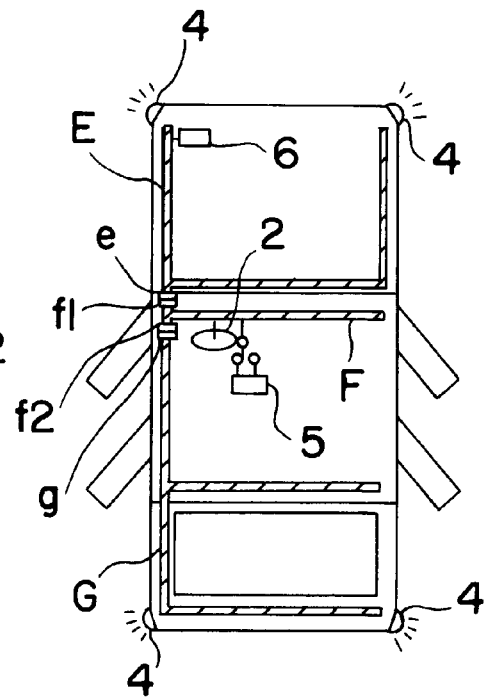
FIG. 2(A)    FIG. 2(B)
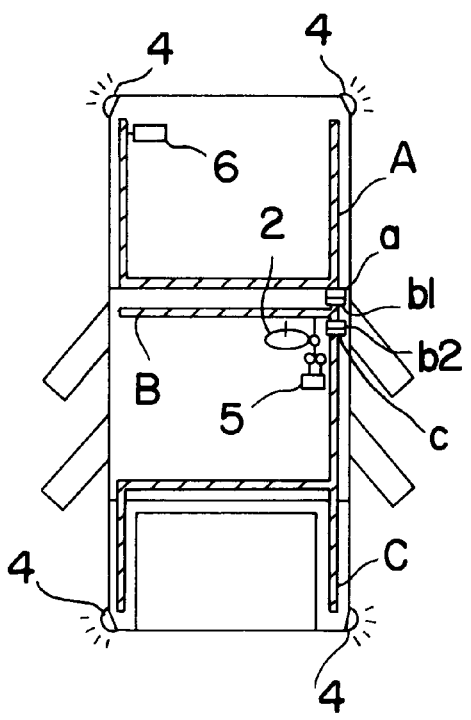
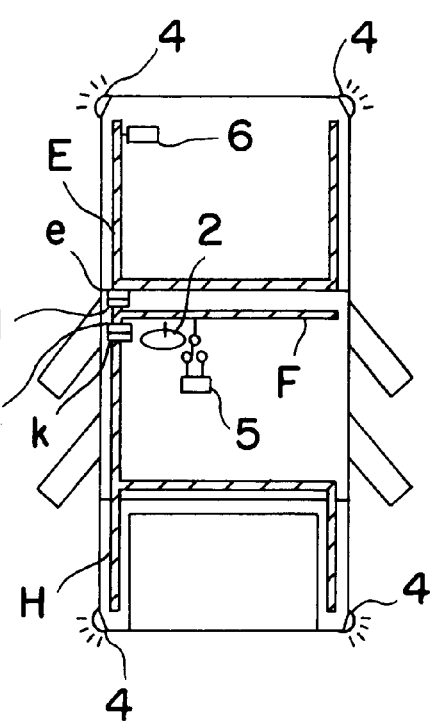
FIG. 2(C)    FIG. 2(D)

WIRE HARNESS FOR VEHICLES

This Application claims the benefit of the priority of Japanese Application 8-63145, filed Mar. 19, 1996.

The present Invention relates to a wiring harness for vehicles such as automobiles (motor cars). More particularly, the Invention relates to a wiring harness having a configuration that can be adopted universally for a first type of vehicle (hereinafter generically designated <<ledged tail >> vehicle), such as a saloon car or any other vehicle having a transversal tail ledge, which allows the passage of wiring across the tail end between the rear brake lights, and a second type of vehicle (hereinafter generically designated <<ledgeless tail>> vehicle), such as a van, pick-up truck or some station wagons, which does not have a tail ledge that allows the passage of wiring across the tail section between the brake lights. The configuration of the wiring harness according to the present Invention can furthermore be used indifferently with left-hand drive and right-hand drive versions of the aforementioned first and second types of vehicles, except for a small adaptation in the cowl and instrument harnesses.

BACKGROUND OF THE INVENTION

In the aforementioned first and second vehicle types with either left-hand or right-hand drives, each variant is equipped with five sets of harnesses: front, floor, rear, cowl and instrument harnesses. The wiring system for each set of harnesses depends on the type of vehicle and the position of the steering wheel. This fact forces manufacturers to prepare varieties of harnesses in order to accommodate for these different versions, and thus causes manufacturing cost to be relatively high.

In Japanese patent application published before examination under the number 8-216 805, there was envisaged a wiring harness system connecting electrical source distributors to different kinds of apparatus. With this system, there was proposed a method of shortening with harness length, irrespective of the position of the steering wheel. However, this document is not related to the problem of rationalizing the whole harness system in vehicles of different types or variants.

FIG. 1 shows a typical front harness A for a right-hand drive, four-door vehicle having a ledged tail. The front harness A has a U-shaped path, the open side of which faces the driving direction, and a connector a on the corner at the right side. To this connector a is connected a cowl harness and an instrument harness B through a connector B1. The front harness is connected to a combined harness C integrating a floor harness and a rear harness, through connectors b2 and c, provided at the right side of the instrument harness B. The combined harness C passes through the right side of the vehicle body towards its rear part and forms therein an inclined U-shaped path, such that the path is open towards the left side of the vehicle body, as seen from the Figure.

In the above wiring harness, a stop switch 1 of a brake pedal is connected to the instrument harness B to the right of the steering wheel 2, on the right-hand side. Stop lamps 3 are connected to the transversal rear end part of the combined harness C, so as to be turned on or off by the switch 1.

FIG. 1(B) shows a same type of four-door ledged tail vehicle as described above, but the vehicle is in this case a left-hand drive version. A front harness E is connected to an instrument harness F through connectors e and f1. The instrument harness F is then connected to a combined harness G integrating a floor harness and a rear harness through connectors f2 and g. The combined harness G passes through the left side of the vehicle body towards its rear part and forms therein an inclined U-shape path, such that the path is open towards the right side of the vehicle body.

In the above left-hand drive vehicle, a stop switch for the brake pedal is connected to the instrument harness F to the left of the steering wheel and therethrough to the combined harness G. Stop lamps 3 connected to the combined harness G are thus lit on or off by the switch 1.

In the above ledged-tail vehicles, the combined harnesses C and G installed in the rear part are in the form of an inclined U having rightward or leftward opening. This structure makes it possible to shorten the connecting pathway to electrical fixtures such as the stop lamps.

FIG. 1(C) shows a four-door ledgeless-tail vehicle with right-hand drive. In this case, a front harness A and an instrument harness B have the same and common path as those in the case of the four-door ledged-tail vehicle with right-hand drive, shown in FIG. 1(A). A combined harness D integrating a floor harness and a rear harness is then connected to a connector b1 of an instrument harness B, through a connector d located at the right side of the vehicle. The combined harness D forms a reversed U-shaped path in the rear part of the vehicle, being open towards the backward direction thereof.

FIG. 1(D) shows a four-door ledgeless-tail vehicle with left-hand drive. In this case, a front harness E and an instrument harness F have the same and common path as those in the case of the four-door ledged-tail vehicle with left-hand drive shown in FIG. 1(B). A combined harness H integrating a floor harness and a rear harness is then connected to a connector f2 of the instrument harness F, through connector h located at the left side of the vehicle. The combined harness H forms a reversed U-shape path, the open side of which faces the backward direction of the vehicle.

In the above ledgeless-tail vehicles, the combined harnesses D and H have the rearwardly-turned opened U-shape, so that there is no obstacle when loading or unloading luggage or goods through the rear door.

FIGS. 2(A) to (D) show the connection position of a turn indicator light switch 5 for turn indicator lights 4, corresponding to each type of vehicle shown in FIGS. 1(A) to (D). In the four-door ledged-tail vehicle (A) and four-door ledgeless-tail vehicle (C), respectively with right-hand drive, the turn indicator light switch 5 is connected to an instrument harness B to the right of the right-hand-side steering wheel 2. By contrast, in the four-door ledged-tail vehicle (B) and four-door ledgeless-tail vehicle (D), respectively with left-hand drive, the turn indicator light switch 5 is connected to an instrument harness F to the right of left-hand-side steering wheel 2.

Further, as in shown in FIGS. 1 and 2, a battery 6 is located at the leftward position in the front part (engine compartment) of the vehicle.

In the right-hand drive vehicles of the ledged-tail A and ledgeless-tail (C) types in FIG. 1, harnesses A and B constitute the common paths, but harnesses C and D do not. On the other hand, in the left-hand drive vehicle of ledged-tail (B) and ledgeless-tail (D) in FIG. 1, there is no common path with the right-hand drive vehicle. In addition, although harnesses E and F are common for the ledged-tail and ledgeless-tail types, harnesses G and H are not.

Consequently, the above-mentioned four types of vehicles need eight different sets of harnesses A to H.

Table 1 shows the number of different harness sets to be prepared per number of vehicles according to the known art. When the ledged-tail vehicles with right-hand or left-hand drive, and the ledgeless tail vehicles with right-hand or left-hand drive, are manufactured in quantities of 1,000, 1,000, 500 and 500 respectively per month, the requirements are: 1,500 units each of harnesses A, B, E and F, 1,000 units each of harnesses C and G, and 500 units each of harnesses D and H.

As described above, the four types of vehicles (including the left-hand and right-hand drive variants) already calls for eight sets of harnesses. The increase in set number makes it difficult to efficiently manufacture harnesses and raises manufacturing costs.

SUMMARY OF THE INVENTION

It is therefore an object of the present Invention to provide a wiring harness for vehicle enabling a rational approach for its manufacture, where the number of different harness sets is reduced by harmonizing the basic paths for the four types of vehicles, i.e. ledged-tail and ledgeless-tail vehicles in left-hand or right-hand drive versions.

To this end, the Invention provides a wiring harness system for vehicle adaptable to two types of vehicles. The first type has a transversal tail ledge portion to allow passage of wiring for interconnecting the left and right brake lights, and can be equipped with either left-hand drive or right-hand drive. The second type has no transversal tail ledge portion to allow passage of wiring for interconnecting the left and right lights thereof, and can also be equipped with either left-hand or right-hand drive.

The wiring harness system includes a front harness, a first combined harness, and a second combined harness. The first combined harness includes a cowl harness and an instrument harness and the second combined harness includes a floor harness and a rear harness. The front harness and the combined harnesses have one or more interconnections.

Both the front harness and the second combined harness can be used for both of the two types of vehicles, regardless of whether they are equipped with left-hand or right-hand drive. The first combined harness, on the other hand, is differently wired depending upon the location of the steering wheel in the vehicle in which it is installed. The interconnection between the front harness and the two combined harnesses is located at either the left or right portion of the vehicle, irrespective of whether the vehicle has left or right-hand drive.

In the wiring harness system, the rear harness may constitute a wiring path between the left- and right-hand sides of the vehicle for connecting the left and right sides of the vehicle, the wiring path being away from a transversal portion of the vehicle at the rear end thereof. The wiring harness system may also have a harness traversing the transversal portion of the vehicle at its rear end, especially if the vehicle is of the ledged tail type.

Preferably, the interconnection is on the side of the vehicle where the battery is located. As the battery is connected to the interconnection by an electrical cable, this shortens the length of the electrical cable.

According to the Invention, two different sets of harnesses, i.e. the second combined harness integrating the floor harness and the rear harness, and the front harness, are common for the four types of vehicles. Only two other harnesses, i.e. two first combined harnesses, each integrating a cowl harness and an instrument harness), for the right- and left-hand drive vehicles are therefore needed. By reducing the number of harness sets from eight to four, the harnesses are efficiently manufactured with low cost.

Further, the harness length may be shortened by connecting the instrument harness to the front harness and to the combined harness integrating the floor harness and the rear harness at the side where the battery is located.

BRIEF DESCRIPTION OF THE DRAWINGS

The above and other objects, features, and advantages of the Invention will be made apparent from the following description of the preferred embodiments, given as a non-limiting example, with reference to the accompanying drawings, in which:

FIGS. 1A, 1B, 1C and 1D are diagrammatic views of a known harness wiring system connected to a stop switch and stop lamps, where FIG. 1A corresponds to a right-hand drive, ledged-tail vehicle, FIG. 1B corresponds to a left-hand drive, ledged-tail vehicle, FIG. 1C corresponds to a right-hand drive, ledgeless-tail vehicle and FIG. 1D corresponds to a left-hand drive, ledgeless-tail vehicle; and FIGS 2A, 2B, 2C and 2D are diagrammatic views of a known harness wiring system connected to a turn indicator light switch and a turn indicator light, where FIG. 2A corresponds to a right-hand drive, ledged-tail vehicle, FIG. 2B corresponds to a left-hand drive, ledged-tail vehicle, FIG. 2C corresponds to a right-hand drive, ledgeless-tail vehicle and FIG. 2D corresponds to a left-hand drive, ledgeless-tail vehicle.

DETAILED DESCRIPTION OF THE PREFERRED EMBODIMENTS

Figure 3A:
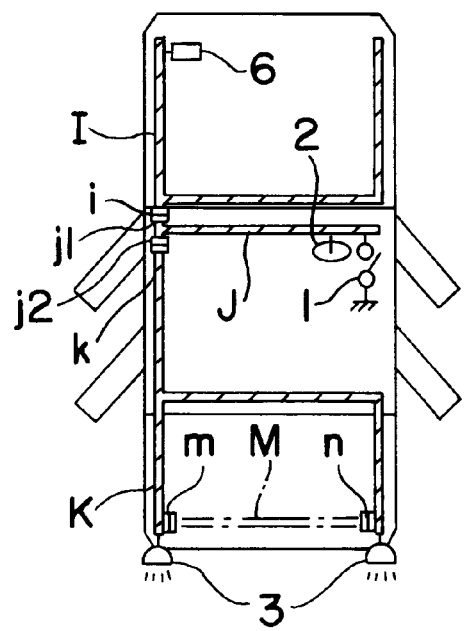
FIGS. 3A, 3B, 3C and 3D are diagrammatic views of the harness wiring system according to the Invention, where FIG. 3A corresponds to a ledged-tail vehicle with right-hand drive, FIG. 3C corresponds to a ledgeless-tail vehicle with right-hand drive, FIG. 3B corresponds to a ledged-tail vehicle with left-hand drive and FIG. 3D corresponds to a ledgeless-tail vehicle with left-hand drive.

In the right-hand drive vehicle shown in FIG. 3A, a front harness I has a U-shaped path opening frontwards and a connecting means i located in the left-side zone of the vehicle. A harness K comprising a floor harness and a rear harness has a U-shaped path opening backwards and a connecting means k located in the left-side zone of the vehicle.

A harness J comprising a cowl harness and an instrument harness has connecting means j1 and j2 located in the left-side zone of the vehicle.

The connection of the above-mentioned harnesses I, J and K is effected through the connecting means i. j1, j2 and k.

In the harness K comprising the floor harness and the rear harness, the rear harness part extends on both of the right-side and left-side zones of the vehicle, but not on the transversal rear end portion thereof, to comply with the requirements of ledgeless-tail vehicles. If such a transversal path becomes necessary, as might be the case with a saloon car type of vehicle, a harness M shown with dots-and-lines in FIG. 3A and corresponding connecting means m and n may be provided so that the harness M is connected to both of the rear end zones of the harness K through these connecting means.

In the above-mentioned right-hand drive vehicles, a stop switch 1 for the brake pedal is connected to the harness J to the right of the right-hand-side steering wheel 2. Through this connection, stop lamps 3, connected to the harness K, can be on or off.

Figure 3B:
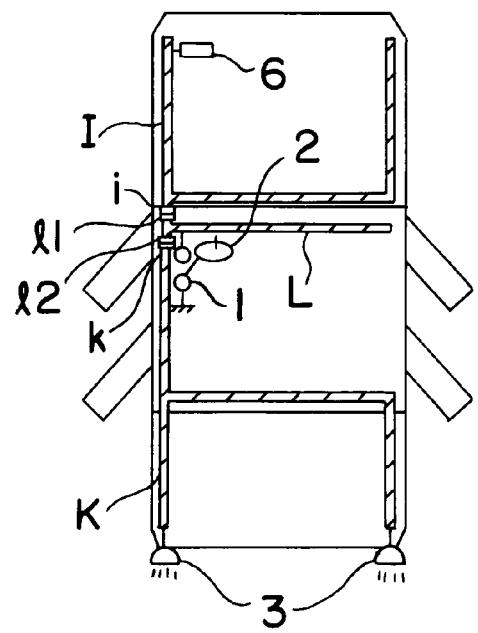
Figure 3C:
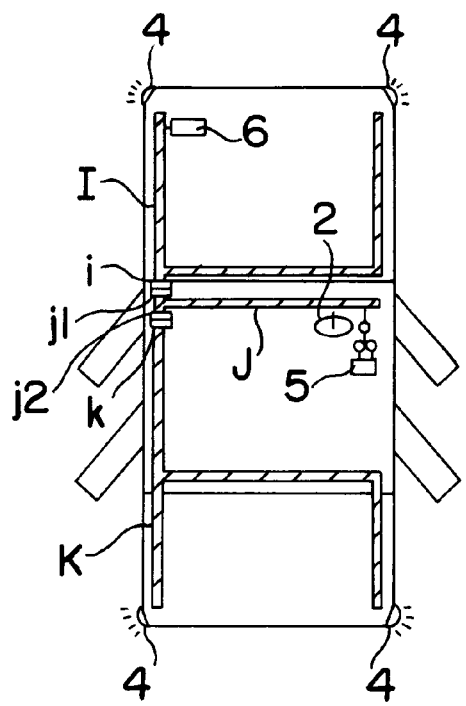

As is shown in FIG. 3C, a turn indicator light switch 5 for turn indicator light 4 is connected to the harness J to the right of the right-hand-side steering wheel, such that the turn indicator light 4 connected to the harness I and K is on or off.

As can be seen for the right-hand drive vehicle, the harnesses I, J and K are the same and can be commonly used, irrespective of the type of vehicle.

Figure 3D:
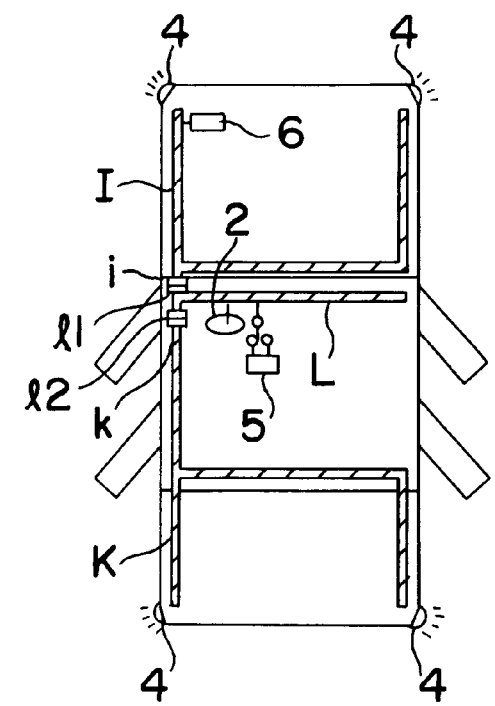

FIGS. 3B and 3D show a four-door ledged-tail or ledgeless-tail vehicle respectively with left-hand drive. In this case, the harnesses I and K, the same as for the right-hand drive vehicles, are also used and can be wired as the common path for both types of vehicles. Only the combined harness L comprising the cowl harness and the instrument harness is different from the combined harness J of the right-hand drive vehicle. Connecting means 11 and 12 between the front harness I and the combined harness K comprising the floor harness and the rear harness can be located at the left side of the vehicle as in the case of the right-hand drive vehicle.

The stop switch 1 and the turn indicator light switch 5 are operated by the driver. In the right-hand drive vehicle shown in FIGS. 1A and 1C, these switches are therefore connected to the harness J in the vicinity of the right-hand-side steering wheel 2. Conversely, in the left-hand drive vehicle shown in FIGS. 1B and 1D, the stop switch 1 and the turn indicator light switch 5 are connected to the harness L in the vicinity of the left-hand-side steering wheel 2.

As mentioned above, harnesses I, K and L are the same for the ledged-tail and the ledgeless-tail vehicles and can be used as the common harness. For the two-types of vehicles and their left-hand and right-hand drive variants, the front harness I and the combined harness K comprising the floor harness and the rear harness form the common path, so that it constitutes two different sets. The combined harnesses J and L, each comprising the cowl harness and the instrument harness, are different for the right- and left-hand drive vehicles, so that it forms two different sets. In total, four sets of harnesses, i.e. harnesses I, K, J and L, are needed.

Table 2 shows the number of different harness sets to be prepared per number of ledged-tail and ledgeless-tail vehicles according to the Invention. When the ledged-tail vehicles respectively with right-hand drive and with left-hand drive are manufactured in quantities of 1,000 units per month and corresponding ledgeless-tail vehicles in quantities of 500 units per month, the requirements are: 3,000 units each of harnesses I and K, 1,500 units of harnesses J and 1,500 units of harnesses L.

Accordingly, only four sets of harnesses, i.e. I, J, K and L, are needed for four types of vehicles, so that the number of harness sets is halved compared to the past practice. As a result, harness manufacturing becomes more efficient, leading to a considerable reduction in manufacturing cost.

According to the Invention, the basic harness paths for four types of vehicles including the left-hand and right-hand drive variants are standardized, so that only the front harness, the combined harness of the floor harness and rear harness, the combined harness forming the cowl harness and instrument harness for the left-hand drive vehicle and that for the right-hand drive vehicle are now needed. This requires only four sets of harnesses. This number is only one half of that needed in the prior art for the above-mentioned four types of vehicles. The decrease in the number of harnesses thereby raises manufacturing efficiency and considerably reduces costs.

TABLE 1

| Vehicles/month | Right-hand drive | | | | Left-hand drive | | | |
|---|---|---|---|---|---|---|---|---|
| Harness sets | A | B | C | D | E | F | G | H |
| Ledged tail vehicle | 1,000 | 1,000 | 1,000 | — | 1,000 | 1,000 | 1,000 | — |
| Ledgeless tail vehicle | 500 | 500 | — | 500 | 500 | 500 | — | 500 |
| Total | 1,500 | 1,500 | 1,000 | 500 | 1,500 | 1,500 | 1,000 | 500 |

TABLE 2

| Vehicles/month | Right-hand drive | | | Left-hand drive | | |
|---|---|---|---|---|---|---|
| Harness sets | I | J | K | I | L | K |
| Ledged tail vehicles | 1,000 | 1,000 | 1,000 | 1,000 | 1,000 | 1,000 |
| Ledgeless tail vehicle | 500 | 500 | 500 | 500 | 500 | 500 |
| Total | 1,500 | 1,500 | 1,500 | 1,500 | 1,500 | 1,500 |

What we claim is:

1. A wiring harness system for vehicle adaptable to each of:

a first type of vehicle having a transverse tail ledge portion allowing a passage of wiring for interconnecting left and right brake lights thereof, said first type of vehicle being either a left-hand drive or a right-hand drive; and a second type of vehicle having no transverse tail ledge portion allowing a passage of wiring for interconnecting left and right lights thereof, said second type of vehicle being either a left-hand or a right-hand drive, said first type of vehicle or said second type of vehicle having a front end and a rear end and adapted for movement in at least a forward direction, said wiring harness system comprising at least a front harness, a first combined harness grouping a cowl harness and an instrument harness, and a second combined harness grouping a floor harness and a rear harness, said front harness, said first combined harness, and said second combined harness each having at least one interconnection, said front harness being U-shaped and open in said forward direction, said second combined harness being U-shaped and open in a rearward direction opposite said forward direction whereby said front harness and said second combined harness are common for said first type and said second type of vehicle irrespective of whether said first type of vehicle or said second type of vehicle has a left-hand drive or a right-hand drive, said first combined harness being differently wired depending on whether said first type of vehicle or said second type of vehicle is a left-hand drive or a right-hand drive, said front harness, said first combined harness, and said second combined harness are mutually interconnected through said at least one interconnection, said interconnection being located at one of either a left-hand or a right-hand part of said first type of vehicle or said second type of vehicle, irrespective of whether said first type of vehicle or said second type of vehicle has a left-hand drive or a right-hand drive.

2. The wiring harness system of claim 1 wherein said rear harness comprises a wiring path between a left side and a right side of said first type of vehicle or said second type of vehicle, thereby to connect said left side and said right side, said wiring path being spaced apart in said forward direction from a transverse portion of said first type of vehicle or said second type of vehicle, said transverse portion being located at said rear end.

3. The wiring harness system of claim 2 comprising a further harness traversing said transverse portion of said first type of vehicle or said second type of vehicle at said rear end.

4. The wiring harness system of claim 1 wherein said at least one interconnection is located on a side of said first type of vehicle or said second type of vehicle at which a battery therefor is located.

5. A vehicle chosen from the group consisting of:

a first type of vehicle having a transversal tail ledge portion allowing a passage of wiring for interconnecting left and right brake lights thereof, said first type of vehicle being either a left-hand drive or a right-hand drive; and a second type of vehicle having no transversal tail ledge portion allowing a passage of wiring for interconnecting left and right lights thereof, and second type of vehicle being either a left-hand or a right-hand drive, said first type of vehicle or said second type of vehicle having a front end and a rear end and adapted for movement in at least a forward direction, said first type of vehicle or said second type of vehicle containing a wiring harness system comprising at least a front harness, a first combined harness grouping a cowl harness and an instrument harness and a second combined harness grouping a floor harness and a rear harness, said front harness, said first combined harness, and said second combined harness each having at least one interconnection, said front harness being U-shaped and open in said forward direction, said combined harness being U-shaped and open in a rearward direction opposite said forward direction whereby said front harness and said second combined harness are common for said first type and second type of vehicle irrespective of whether said first type of vehicle or said second type of vehicle has a left-hand drive or a right-hand drive, said first combined harness being differently wired depending on whether said first type of vehicle or said second type of vehicle is a left-hand drive or a right-hand drive, said front harness, said first combined harness and said second combined harness are mutually interconnected through said at least one interconnection, said interconnection being located at one of either a left-hand or a right-hand part of said first type of vehicle or said second type of vehicle irrespective of whether said first type of vehicle or said second type of vehicle has a left-hand drive or a right-hand drive.

6. The vehicle according to claim 5 wherein said rear harness comprises a wiring path between a left side and a right side of said first type of vehicle or said second type of vehicle, thereby to connect said left side and said right side, and wiring path being spaced apart in said forward direction from a transverse portion of said first type of vehicle or said second type of vehicle, said transverse portion being located at said rear end.

7. The vehicle of claim 6 comprising a further harness traversing said transverse portion of said first type of vehicle or said second type of vehicle at said rear end.

8. The vehicle of claim 5 wherein said at least one interconnection is located on a side of said first type of vehicle or said second type of vehicle at which a battery therefor is located.

9. The vehicle of claim 7 which has a ledged-tail type vehicle.

* * * * *